Sept. 4, 1962  W. R. C. PIEPER  3,052,870
SIGNALLING ARRANGEMENT USABLE FOR INDICATING THE POSITION
OF A PARKING BRAKE AT THE WILL OF THE OPERATOR
Filed Nov. 24, 1958  3 Sheets-Sheet 1

INVENTOR.
Walter R. C. Pieper
BY Michael S. Striker
Attorney

Sept. 4, 1962 W. R. C. PIEPER 3,052,870
SIGNALLING ARRANGEMENT USABLE FOR INDICATING THE POSITION
OF A PARKING BRAKE AT THE WILL OF THE OPERATOR
Filed Nov. 24, 1958 3 Sheets-Sheet 2
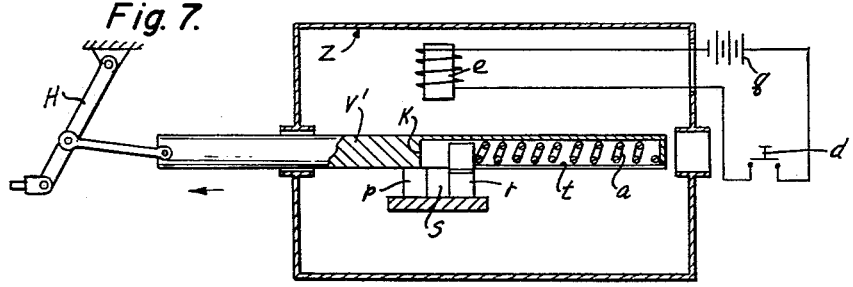
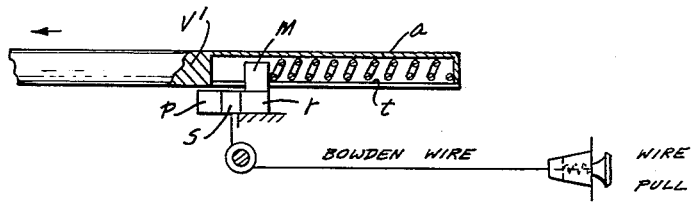
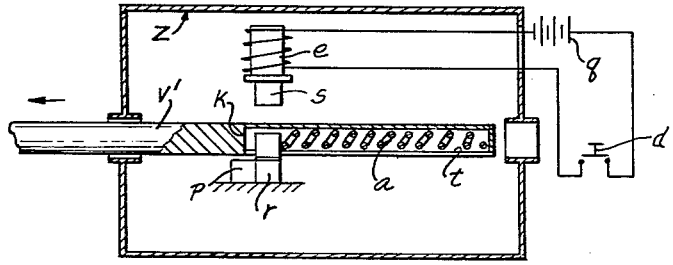
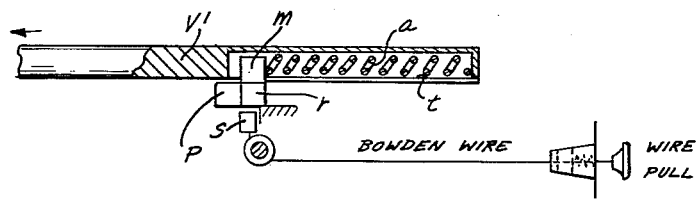
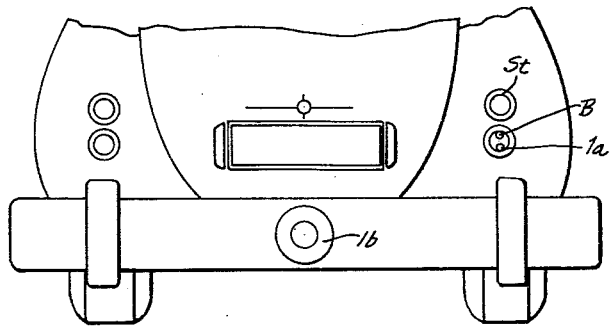
INVENTOR.
Walter R. C. Pieper
BY
Michael S. Striker
Attorney Sept. 4, 1962 W. R. C. PIEPER 3,052,870
SIGNALLING ARRANGEMENT USABLE FOR INDICATING THE POSITION
OF A PARKING BRAKE AT THE WILL OF THE OPERATOR
Filed Nov. 24, 1958 3 Sheets-Sheet 3
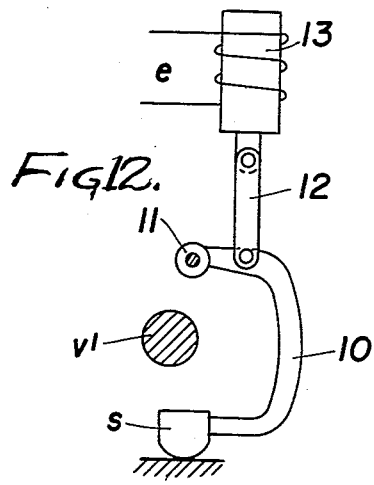
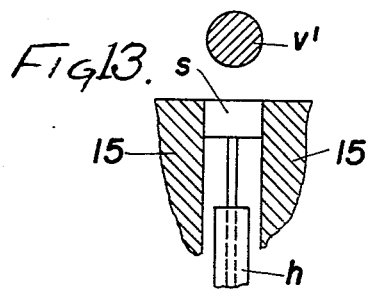
INVENTOR.
Walter R. C. Pieper
BY
Michael S. Striker
Attorney United States Patent Office 3,052,870
Patented Sept. 4, 1962

3,052,870
SIGNALLING ARRANGEMENT USABLE FOR INDICATING THE POSITION OF A PARKING BRAKE AT THE WILL OF THE OPERATOR
Walter R. C. Pieper, Brandstwiete 29, Hamburg, Germany
Filed Nov. 24, 1958, Ser. No. 775,754
Claims priority, application Germany Nov. 23, 1957
12 Claims. (Cl. 340—69)

The present invention relates to signal arrangements. More particularly, the present invention relates to an electrical signalling arrangement which is capable of signalling the existence of a given condition only at the will of the operator.

For example, it is desirable under some conditions to provide an automobile signal indicating when the automobile is held stationary by the parking brake thereof while under other conditions it is undesirable to signal that the condition exists where the automobile is held stationary by the parking brake thereof. Thus, it may be against the law in certain localities to indicate with a signal lamp, for example, that the parking brake of an automobile has been actuated to hold the latter stationary. On the other hand, when changing a tire at night on an open highway it may be very desirable to provide a lamp which is energized by actuation of the parking brake so as to warn other vehicles away from the stopped vehicle. Thus, it is seen that under some conditions it is desirable to signal the operation of a parking brake and under other conditions it is not desirable to signal the operation of a parking brake. A further example of conditions where it is undesirable to signal actuation of a parking brake is, for example, when the operator uses the parking brake to retard downhill movement of the vehicle.

It is accordingly a primary object of the present invention to provide a structure capable of signalling the existence of a given condition only at the will of the operator.

A further object of the present invention is to provide a structure which will automatically assume a position preventing a given condition from being indicated until the operator chooses to have this condition indicated.

Another object of the present invention is to provide a signalling structure of the above type which is reliable in operation and incapable of being actuated in an unauthorized manner by children, for example.

An additional object of the present invention is to provide a signalling of the above type particularly suitable for use with a parking brake of a vehicle.

Further it is an object of the invention to provide a structure which will automatically and reliably independent on any intentional influence return to its position preventing a given condition from being indicated as soon as such a condition ends after having been indicated at the will of the operator before.

It is also an object of the present invention to provide in an automobile a signalling arrangement of the above type which can make use of a lamp used by the automobile for another purpose.

With the above objects in view the present invention includes in a signalling assembly a signalling means for signalling the existence of a given condition. In accordance with the present invention a willfully operable means cooperates with the signalling means to prevent the latter from giving a signal while the willfully operable means is in a rest position thereof. This willfully operable means can be moved by the operator away from its rest position so that the signalling means can then give the signal. The willfully operable means of the present invention is capable of automatically returning to its rest position when released by the operator and when the signalling means no longer gives a signal so that the willfully operable means automatically assumes a position preventing the next operation of the signalling means until the operator again moves the willfully operable means away from its rest position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 diagrammatically illustrates a parking brake and electrical signalling arrangement used in an automobile;

Figure 1:
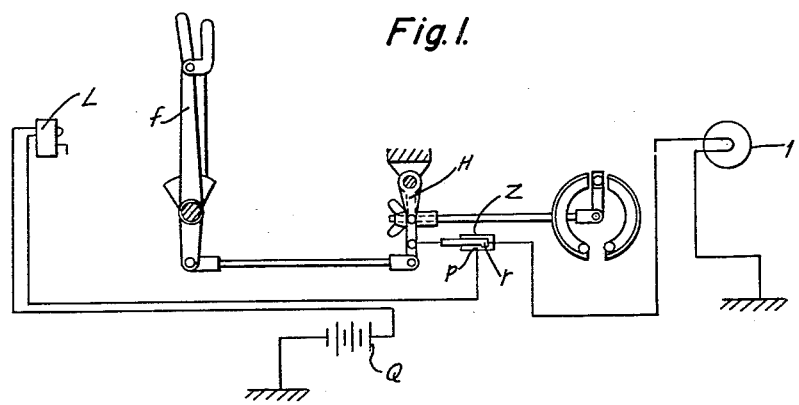
Figure 2:
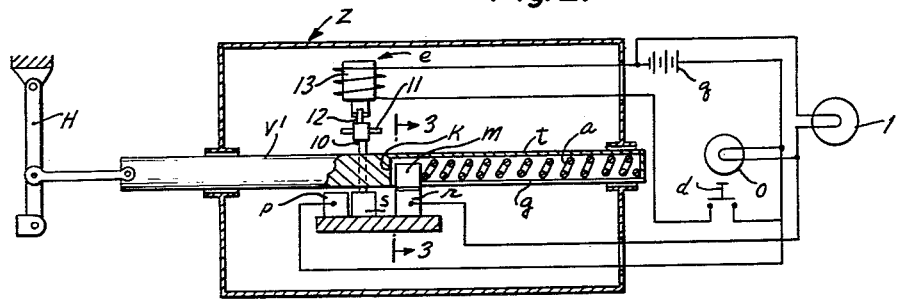
FIG. 2 shows at an enlarged scale part of the switch structure of FIG. 1 which includes the structure of the invention.
Figure 3:
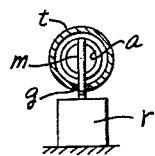
FIG. 3 is a section taken along line 3—3 of FIG. 2 in the direction of the arrows.
Figure 4:
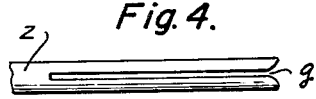
Figure 5:
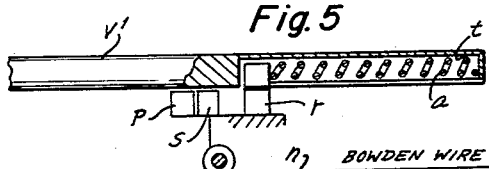
Figure 6:
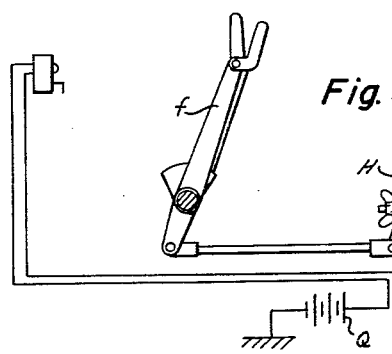

FIG. 4 diagrammatically illustrates a slotted portion of a hollow rod of the structure of FIGS. 2 and 3;

FIG. 5 fragmentarily illustrates a different embodiment having a mechanical rather than an electrical release;

FIG. 6 shows the structure of FIG. 1 in an operating position, the structure being shown in FIG. 1 in a rest position;

FIG. 7 shows the structure of FIG. 2 in an operating position, FIG. 2 illustrating this structure in a rest position;

FIG. 8 shows a structure of FIG. 5 in an operating position, FIG. 5 showing the structure in a rest position;

FIG. 9 shows the structure of FIG. 7 in a second operating position subsequent to the operating position shown in FIG. 7;

FIG. 10 shows the structure of FIG. 8 in a second operating position subsequent to the operating position shown in FIG. 8;

FIG. 11 diagrammatically illustrates a signal lamp arrangement carried by a vehicle;

FIG. 12 illustrates the support structure for part of the device of FIGS. 2, 7 and 9; and FIG. 13 shows guide structure for part of the device of FIGS. 5, 8 and 10.

Referring now to the drawings, FIGS. 1 and 6 show the structure of the invention used to indicate that a parking brake $f$ of a vehicle has been applied. The signal of the existence of this condition is provided by energizing of the lamp $l$. The lamp $l$ is connected in series with a switch structure Z of the present invention and with the lamp switch L of the vehicle to the battery Q, the switch L being the conventional light switch used for the head lamps, dash, etc. of the vehicle. When the parking brake $f$ is actuated by the operator so as to be moved from the inactive position thereof shown in FIG. 1 to the active position shown in FIG. 6, the lever H is turned to apply the brake and also to bring a pair of contacts $p$ and $r$ of the switch Z into engagement for closing the circuit to the lamp $l$. In the position of the parts shown in FIG. 1 the contacts $p$ and $r$ are spaced from each other and the lamp $l$ is extinguished.

Thus, the switch Z forms together with the lamp $l$ a signal means for signalling the existence of a given condition, namely, the applying of the parking brake $f$. In accordance with the present invention a willfully operable means cooperates with this signal means for preventing the latter from signalling the existence of the given condition until the willfully operable means is moved by the operator away from a rest position thereof. This willfully operable means includes a blocking member $s$ shown in FIG. 2 where the switch Z is illustrated at an enlarged scale. This blocking member $s$ is located between the contacts $p$ and $r$ to prevent the latter from engaging each other and energizing the lamp $l$ as long as the blocking member $s$ is in the rest position thereof shown in FIG. 2. In the example illustrated in FIG. 2 the contact $p$ is stationary mounted on member 15' fastened to the housing of switch Z while the contact $r$ is movable toward and away from the contact $p$, this contact $r$ being guided for movement on member 15' carried by the switch Z and diagrammatically shown in FIG. 2.

As may be seen from FIGS. 2–4 the contact $r$ is fixed to a blade $m$ which extends upwardly from the contact $r$ through a longitudinal slot $g$ formed along the bottom of a hollow rod $t$ into the latter. This hollow rod $t$ forms an extension of a bar $v'$ which has a solid bar portion terminating in an end surface $k$ where the hollow rod $t$ is connected to the solid bar portion, this hollow rod $t$ terminating distant from the solid bar portion in an end wall against which one end of a coil spring $a$ in rod $t$ abuts. The other end of the spring $a$ abuts against the blade $m$ so that when the parts have the position shown in FIGS. 6 and 7 where the bar $v't$ has been shifted to the left by turning of the lever H from the position of FIG. 2 to that of FIG. 7 the spring $a$ will be compressed and will urge the movable contact $r$ toward the stationary contact $p$, the contact $r$ being prevented from moving into engagement with the contact $p$ by the blocking member $s$, as shown in FIG. 7.

The willfully operable means for preventing energizing of the lamp $l$ until a moment chosen by the operator includes in addition to the blocking member $s$ an electromagnet $e$ capable of being energized by the operator and operatively connected to the blocking member $s$ for moving the latter away from its rest position between the contacts $p$ and $r$ so that at the will of the operator the circuit to the lamp $l$ can be completed. As is shown in FIG. 13, the blocking member $s$ is carried by a lever 10 which extends partly around the rod $v'$ and which is turnably supported on a stationary pivot 11. A link 12 is pivotally connected to the lever 10 and to the armature 13 of the electromagnet $e$ so that when the latter is energized the lever 10 together with the blocking member $s$ will be swung in a counterclockwise direction, as viewed in FIG. 12, to a position where the member $s$ is no longer located between the contacts $p$ and $r$ so that at this time the spring $a$ can expand and move the contact $r$ into engagement with the contact $p$ as indicated in FIG. 9. As is shown in FIG. 7 the coil of the electromagnet $e$ is located in a completely separate circuit and can be energized upon manual action of a push-button switch $d$. The latter switch is urged by a spring to its open position as soon as it is released by the operator. If desired the switch $d$ can be coupled by an unillustrated structure to the lever H, for example, for compulsorily guaranteeing that the switch $d$ is open when the parking brake is released.

It will be noted that two conditions are required for energizing the lamp $l$, one of these conditions being the actuation of the hand brake $f$ and the other being the closing of the switch $d$. Therefore, if the hand brake is not operated and is in the rest position shown in FIG. 1, then even though the switch $d$ is accidentally closed or closed by curious children, for example, the lamp $l$ will not be energized. As is shown in FIG. 2 the switch $d$ may be provided with its own signal lamp $o$ connected in series with the lamp $l$.

Instead of the circuit of FIGS. 1 and 6 where the lamp $l$ and the negative pole of the battery Q are grounded, the negative contact of the lamp $l$ can be connected with the negative pole of the battery Q by a separate insulated conductor and the positive pole of the lamp $l$ can be via the switch Z connected directly with the positive pole of the battery Q so that the energizing of the switch L and the lamp $l$ does not require closing of the switch L and the lamp $l$ can be energized at any time, even in the day time.

As is shown in FIGS. 2, 7 and 9 a separate current source $q$ separate from the battery Q is provided for the circuit of the electromagnet $e$ and the contacts $p$ and $r$ and the lamp $l$, and these latter elements may be switched over to an electrical connection with the battery Q if desired with or without a conductor which is insulated interconnecting the negative poles as described above.

Instead of an electrically operable means for moving the blocking member $s$ from its rest position at the will of the operator, a purely mechanical means may be provided for this purpose, as indicated in FIGS. 5, 8 and 10. In this embodiment the blocking member $s$ is connected to the Bowden cable $n$ which is provided with the knob $b$ so that when the knob $b$ is pulled the blocking member $s$ will be moved downwardly away from its rest position between the contacts $p$ and $r$ so that the spring $a$ can move the contact $r$ into engagement with the contact $p$ when the parking brake $f$ is engaged, as described above. FIG. 5 shows the structure in the rest position, while FIG. 8 shows position of the parts with the parking brake engaged and the blocking member $s$ in its rest position, FIG. 10 showing the position which the parts take with the parking brake engaged and the blocking member $s$ moved by the operator away from its rest position. The spring $c$ of the Bowden cable urges the blocking member $s$ back to its rest position. FIG. 13 shows the guiding structure 15 for guiding the blocking member $s$. The contact $r$ of FIGS. 5, 8 and 10 is wider and longer than the blocking member $s$ so that the latter can move freely with respect to the guide for the contact $r$ while the contact $r$ can extend beyond its guide while still remaining in engagement with the latter to a position over the blocking member $s$ when the latter is in a position of FIG. 10.

While the blocking member $s$, when it is in its rest position, blocks the contact $r$ to prevent the latter from moving into engagement with the contact $p$, the contact $r$, when it engages the contact $p$, prevents return of the blocking member $s$ to its rest position even though the operator has released the switch $d$ or the Bowen cable $n$. The Bowden cable automatically returns the blocking member $s$ to its rest position as soon as the braking is released and as is shown in FIG. 13 the blocking member $s$ will return automatically by gravity to its rest position when the parking brake is released in the embodiment of FIGS. 2, 7 and 9. The blocking member $s$ willfully operated to put into operation the signal provided for signalling the existence of a given condition will return automatically to its rest position as soon as said given condition ends. Signalling of another existence of said given condition will not be possible before the blocking member $s$ is again willfully operated. Thus, it is unnecessary for the operator to be concerned with resetting of the signalling structure of the invention since this structure automatically resets itself. Of course, as soon as the hand brake $f$ is released the bar $v't$ advances to the right to its rest position, as viewed in the drawing, and the surface $k$ engages the blade $m$ to return contact $r$ to its rest position so as to maintain the circuit of the signal lamp open irrespective of energizing of electromagnet $e$ or release of knob $b$.

FIG. 11 illustrates a signal lamp arrangement which does not require additional covers. FIG. 11 shows conventional stop lights B which are actuated during normal driving whenever the operator actuates the foot brake. Over the stop lights B are the back-up lights St, respectively. The right stop light B of FIG. 11 also functions as the lamp $l$ of the signalling arrangement of the present invention. Since the stop lights which are illuminated upon actuation of the foot brake would not be illuminated whenever the parking brake is actuated since the two brakes are never actuated simultaneously, there is no conflict between these two operations and it is therefore possible to use the same lamp for indicating conventional operation of the foot brake and operation of the hand brake according to the present invention. Of course, both stop lights may be used for this purpose if desired.

In the event that it is desired to provide a signal upon actuation of the hand brake (after manual operation of switch d or Bowden cable n) which is distiguishable from the signal provided by operation of the foot brake, then an additional bulb 1a may be provided behind the glass of the lamp B to provide a light of greater intensity for the signal of the present invention. Also, it is possible to include a blinker switch in the circuit to provide a blinker signal distinguishable from conventional operation by the foot brake.

The signal lamp of the present invention may also be in the form of a separate lamp 1b of the same color as any one of the other lamps but distinguishable therefrom by its special location. In the illustrated example the separate lamp 1b is located in the central vertical plane of the vehicle at the rear thereof and may be mounted on the rear bumper in any convenient manner. Furthermore, a blinker signal may also be provided in this case, if desired.

Thus, it will be seen that by providing an additional lamp for the brake light or an entirely separate lamp 1b at a special location it is possible without the use of any additional color to provide a lamp signal according to the present invention which has a property which distinguishes it from the conventional lamp.

Of course, the blocking member s is made of an electrically non-conductive material.

It will be noted that with the structure of the invention it is possible for the operator of the vehicle to provide a warning signal in the form of a blinker light, for example, as soon as the vehicle is stopped and held by the parking brake. Thus, it is possible when stopping to change a tire on an open highway to provide a warning signal to other vehicles even before the operator leaves the vehicle. This possibility is in sharp contrast to conventional warning arrangements where the operator must first stop the car, and then set up flares or similar warning devices over a predetermined distance behind the vehicle. During the time that such flares or the like are set up it is possible for serious accidents to occur, and this disadvantage is avoided with the structure of the invention.

It will be understood that each of the elements described above, or two or more together, may also find a useful application in other types of signals differing from the types described above.

While the invention has been illustrated and described as embodied in electrical signal arrangements, it is not intended to be limited to the details shown, since various modifications and structural changes may be made without departing in any way from the spirit of the present invention.

What is claimed as new and desired to be secured by Letters Patent is:

1. A signal arrangement, comprising in combination, signal means; actuating means for actuating said signal means in response to changes of a condition to be indicated, said actuating means being movable between an idle position and a signal actuating position; operator actuated blocking means movable between an inoperative position and a blocking position for preventing, when in said blocking position, movement of said signal actuating means from said idle position into said signal actuating position; and means mounting said blocking means in a position tending to return to its blocking position when released by the operator, whereby said blocking means prevents said actuating means from again actuating said signal means in response to changes of said condition until the operator moves said blocking means away from said blocking position.

2. A signal arrangement, comprising in combination, electrical signal means; actuating means for automatically actuating said signal means in response to changes of a condition to be indicated, said actuating means including a pair of contacts at least one of which is movable toward and into engagement with the other for closing a circuit which energizes said electrical signal means to indicate the existence of said condition; operator actuated blocking means movable between an inoperative position and a blocking position and cooperating with said movable contact to prevent the latter from reaching said other contact and closing said circuit while said blocking means is in said blocking position thereof; and means mounting said blocking means in a position tending to return to its blocking position when released by the operator, whereby said blocking means prevents said actuating means from again actuating said signal means in response to changes of said condition until the operator moves said blocking means away from said blocking position.

3. A signal arrangement, comprising in combination, electrical signal means; actuating means for automatically actuating said signal means in response to changes of a condition to be indicated, said actuating means including a pair of contacts at least one of which is movable toward and into engagement with the other for closing a circuit which energizes said electrical signal means to indicate the existence of said condition; operator actuated blocking means movable between an inoperative position and a blocking position located between said contacts, said blocking means cooperating with said movable contact to prevent the latter from reaching said other contact and closing said circuit while said blocking means is in said blocking position thereof; and means mounting said blocking means in a position tending to return to its blocking position when released by the operator, whereby said blocking means prevents said actuating means from again actuating said signal means in response to changes of said condition until the operator moves said blocking means away from said blocking position.

4. An electrical signal arrangement comprising, in combination, electrical signal means; actuating means for actuating said signal means in response to changes of a brake position to be indicated, said actuating means including a pair of contacts at least one of which is movable between an idle position spaced from the other of said contacts and a signal actuating position engaging said other contact to actuate said electrical signal means; a blocking member having a blocking position for preventing movement of said movable contact into engagement with said other contact so as to prevent said actuating means from actuating said signal means while said blocking member is in said blocking position thereof; electromagnetic means operatively connected to said blocking member to move the latter away from said blocking position when said electromagnetic means is energized; support means supporting said blocking member for return to said blocking position when said electromagnetic means is de-energized; and switch means connected electrically with said electromagnetic means for energizing the latter at the option of the operator.

5. A signal arrangement as defined in claim 4 in which said switch means are constituted by a normally open push-button switch.

6. A signal arrangement comprising, in combination, signal means; first actuating means for actuating said signal means in response to changes of a brake position to be indicated, said actuating means having an idle position when said brake is not applied and an operating position when said brake is applied; blocking means movable between an inoperative position and a blocking position and cooperating with said actuating means for preventing, when in said blocking position, said actuating means from actuating said signal means; moving means for moving said blocking means away from its blocking position whenever actuated; second operator controlled actuating means for actuating said moving means so that the latter moves said blocking means away from its blocking position; and means mounting said blocking means for return to said blocking position when said moving means is not actuated by the operator and said actuating means has returned to said idle position thereof, whereby said actuating means will actuate said signal means when the brake is applied only after said blocking means has been moved away from its blocking position by actuating said moving means by the operator and whereby said blocking means will return to its blocking position when said actuating means returns to its idle position so that said actuating means is prevented from actuating said signal means from again signalling the application of the brake until the operator again actuates said moving means to move said blocking means away from its blocking position.

7. An electrical signal arrangement, comprising, in combination, electrical signal means; actuating means for automatically actuating said signal means in response to changes of a condition to be indicated, said actuating means including a pair of contacts at least one of which is movable toward and into engagement with the other for closing a circuit which energizes said electrical signal means so as to indicate the existence of said condition; a blocking member having a rest position located between said contacts to prevent said movable contact from engaging said other contact so as to prevent said actuating means from actuating said signal means while said blocking member is in said rest position; electromagnetic means operatively connected to said blocking member to move said blocking member away from said rest position when said electromagnetic means is energized; and support means supporting said blocking member for returning to its rest position when said electromagnetic means is de-energized.

8. An electrical signal arrangement comprising, in combination, electrical signal means; actuating means for automatically actuating said signal means in response to changes of a condition to be indicated, said actuating means including a pair of contacts at least one of which is movable toward and into engagement with the other for closing a circuit which energizes said electrical signal means so as to indicate the existence of said condition; a blocking member having a rest position located between said contacts to prevent said movable contact from engaging said other contact so as to prevent said actuating means from actuating said signal means while said blocking member is in said rest position; electromagnetic means operatively connected to said blocking member to move said blocking member away from its rest position when said electromagnetic means is energized; support means supporting said blocking member for return to its rest position when said electromagnetic means is de-energized; and operator actuated means cooperating with said electromagnetic means for energizing the latter at the option of the operator.

9. An electrical signal arrangement, comprising, in combination, electrical signal means; actuating means for automatically actuating said signal means in response to changes of a condition to be indicated, said actuating means including a pair of contacts at least one of which is movable toward and into engagement with the other for closing a circuit which energizes said electrical signal means so as to indicate the existence of said condition; a blocking member having a rest position located between said contacts to prevent said movable contact from engaging said other contact so as to prevent said actuating means from actuating said signal means while said blocking member is in said rest position; and manually operable Bowden cable means connected to said blocking member for supporting the same in said rest position thereof, for moving said blocking member away from its rest position upon actuation of said Bowden cable means by the operator, and for returning said blocking member to said rest position thereof upon release of said Bowden cable means by the operator.

10. In a signal arrangement for a machine, in combination, a first lamp for signalling a first condition and having a given color; a second lamp of the same color as said first lamp but having a different location which distinguishes said second lamp from said first lamp; actuating means co-operating with said second lamp for energizing the latter when a second condition exists; operator actuated blocking means movable between an inoperative and a blocking position and said blocking means moving, when actuated by an operator, from said blocking to said inoperative position, said blocking means cooperating with said actuating means when said blocking means is in a blocking position thereof to prevent said actuating means from energizing said second lamp until said blocking means is moved by the operator from its blocking position; and support means supporting said blocking means in its inoperative position for returning to its blocking position when not actuated by the operator and when said actuating means no longer energizes said second lamp.

11. An electrical signal arrangement, comprising, in combination, electrical signal means; actuating means for automatically actuating said electrical signal means in response to a condition to be indicated, said actuating means including a pair of contacts at least one of which is movable toward and into engagement with the other for closing a circuit which energizes said electrical signal means so as to indicate the existence of said condition; a blocking member having a blocking position located between said contacts to prevent said movable contact from engaging said other contact so as to prevent said actuating means from actuating said signal means while said blocking member is in said blocking position thereof; electromagnetic means operatively connected to said blocking member to move said blocking member away from its blocking position when said electromagnetic means is energized; support means supporting said blocking member for returning to its blocking position when said electromagnetic means is de-energized; and switch means connected electrically with said electromagnetic means for energizing the latter at the option of the operator.

12. A signal arrangement comprising, in combination, signal means; actuating means for actuating said signal means in response to a condition to be indicated, said actuating means having an idle position when said condition does not exist and an operating position when said condition does exist; blocking means movable between an inoperative and a blocking position and cooperating with said actuating means for preventing, when in said blocking position, movement of said actuating means to said operating position thereof so that said signal means cannot signal said condition while said blocking means is in said blocking position thereof; operator controlled moving means operatively connected to said blocking means for moving the same away from its blocking position so that said signal means can signal the existence of said condition only after movement of the blocking means by the operator away from said blocking position; and means mounting said blocking means for return to its blocking position when said actuating means returns to its idle position so that said blocking means prevents said signal means from again signalling said condition until the operator again moves said blocking means away from its blocking position.

References Cited in the file of this patent

UNITED STATES PATENTS

| | | |
|---|---|---|
| 945,935 | Girard | Jan. 11, 1910 |
| 1,270,789 | Cookingham | July 2, 1918 |
| 1,531,874 | Pogue | Mar. 31, 1925 |